(No Model.)
A. E. TENNEY.
FRICTION CLUTCH.
No. 244,091. Patented July 12, 1881.
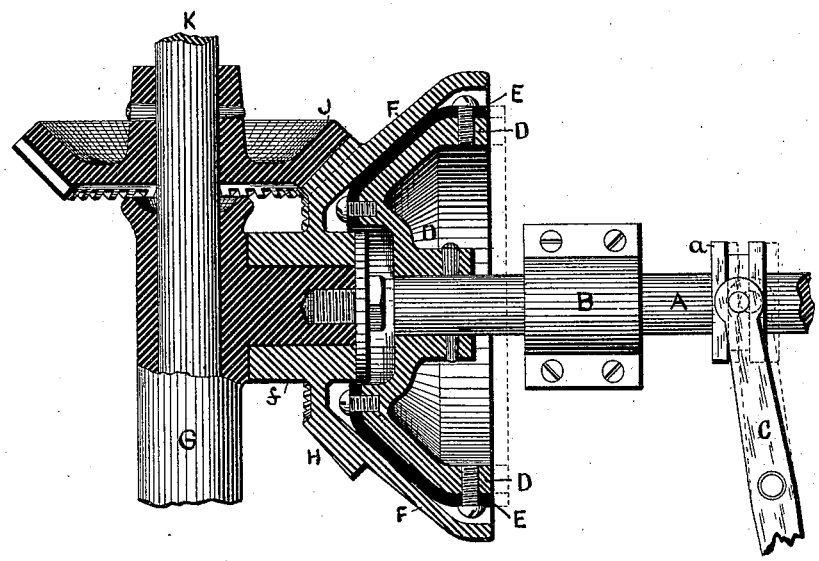
WITNESSES,
H. H. Thurston.
J. Knight
INVENTOR,
Alfred E. Tenney

UNITED STATES PATENT OFFICE.

ALFRED E. TENNEY, OF PROVIDENCE, RHODE ISLAND, ASSIGNOR TO JOHN B. ANTHONY, OF SAME PLACE.

FRICTION-CLUTCH.

SPECIFICATION forming part of Letters Patent No. 244,091, dated July 12, 1881.

Application filed March 7, 1881. (No model.)

*To all whom it may concern:*

Be it known that I, ALFRED E. TENNEY, of the city and county of Providence, and State of Rhode Island, have invented a new and useful Improvement in Friction-Clutches; and I do hereby declare that the following specification, taken in connection with the accompanying drawing, forming a part of the same, is a full, clear, and exact description thereof.

My invention relates to friction-clutches for connecting and disconnecting shafts, &c.; and my improvement consists in the construction of the clutch, as will hereinafter appear.

In the drawing my improved clutch is shown as applied to two shafts at right angles to each other; but, as will be readily seen, it is equally applicable to shafts whose axes are in alignment.

Referring to the drawing, A is the driving-shaft, which is mounted in a journal-bearing, B, and provided with a collar, $a$, which is engaged by a shipping-lever, C. The male member D of the clutch is secured to the shaft A. Its form is generally that of a truncated cone, or it may be hemispherical, and its surface is covered with a conical washer or pad of leather or other elastic material, E.

F is the fellow-member of the clutch, and is in the shape of a hollow truncated cone, or corresponding with the form of the male member D. It is provided with a hub, $f$, and is mounted so as to rotate on a stud which projects from a standard, G. The outer periphery of the member F is provided with the teeth H of a bevel-gear, which mesh with a bevel-gear, J, secured to the driven shaft K. When the male member D of the clutch is moved into engagement with the fellow-member F, the covering E frictionally engages the inner surface of the member F against which it is jammed, and drives the shaft K through the gear-connections.

The novelty in this clutch thus far described consists in the conical washer or pad E, of leather or any other soft but strong, yielding material, and securing the same in position by screws $g$ at the inner and outer annular edges thereof, whereby said washer or pad is readily applied or removed for the substitution of another, and firmly secured in position against the severe rotary strains incident to its use.

It is obvious that the interior conical surface of the female member F may also be supplied with a similar pad or washer similarly secured, so that two coincident yielding surfaces will be in contact when the clutch is in use, thus securing a firm clutching contact with a minimum of pressure on the shipping-lever.

If desired, the concave surface of the member F may be provided with the covering of elastic material instead of the member D, or both members may have an elastic facing; but I prefer the construction shown in the drawing.

If the driving and driven shafts are in alignment, a gear-connection will be dispensed with and the member F will be secured to the driven shaft.

What I claim as my invention, and desire to secure by Letters Patent, is—

In a friction-clutch, the combination, with the male and female parts, having conical coincident faces, of the flexible conical washer or pad, secured near the inner and outer annular edges thereof by means of screws, substantially as described.

ALFRED E. TENNEY.

Witnesses:
  W. H. THURSTON,
  I. KNIGHT.